E. ERICKSON.
KEYLESS PADLOCK.
APPLICATION FILED JUNE 19, 1914.
1,150,353.
Patented Aug. 17, 1915.
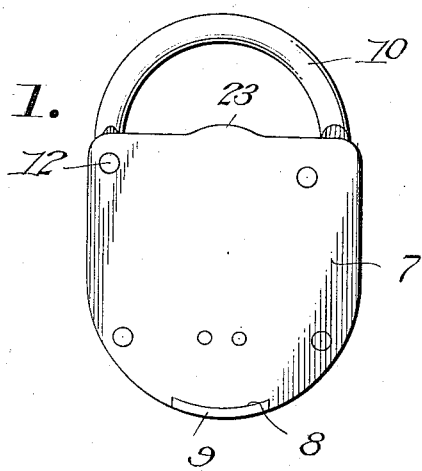
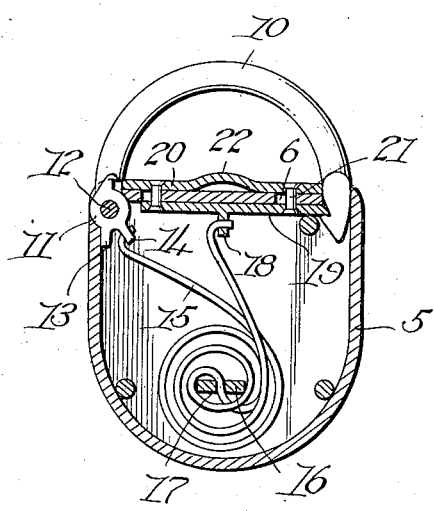
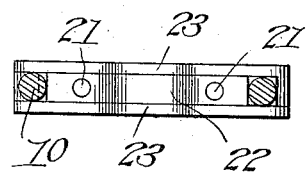
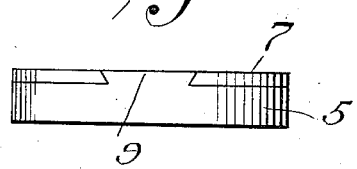
Witnesses
Inventor
Edward Erickson
By Richard B. Owen
Attorney
COLUMBIA PLANOGRAPH CO., WASHINGTON, D. C.

UNITED STATES PATENT OFFICE.

EDWARD ERICKSON, OF FRESNO, CALIFORNIA.

KEYLESS PADLOCK.

1,150,353.  Specification of Letters Patent.  Patented Aug. 17, 1915.

Application filed June 19, 1914. Serial No. 846,157.

*To all whom it may concern:*

Be it known that I, EDWARD ERICKSON, a citizen of the United States, residing at Fresno, in the county of Fresno and State of California, have invented certain new and useful Improvements in Keyless Padlocks, of which the following is a specification.

This invention has reference to keyless padlocks.

A principal object of this invention is to provide a simple device which will be effectual in its operation, and may be expeditiously unlocked by any one familiar with its operation.

A further object is to eliminate the necessity of adjusting the parts in any way in order to insure locking of the shackle in the casing, after the shackle has been unlocked, since by the formation provided in this invention, the shackle will be automatically locked upon being reëngaged in the casing.

Other objects as well as the nature, characteristic features and scope of my invention will be more readily understood from the following description taken in connection with the accompanying drawings and pointed out in the claims forming a part of this specification.

Referring to the drawings: Figure 1 is a front elevational view of the lock constructed in accordance with my invention, Fig. 2 is a similar view showing the front plate being removed and portions of the casing shown in sections, Fig. 3 is a top plan view of the lock, the shackle being removed therefrom, and Fig. 4 is a bottom plan view, showing the manner in which the front plate of the casing is connected.

In the drawings wherein is illustrated the preferred embodiment of this invention, a casing 5 is provided which is of the usual configuration having an elongated opening 6 in the upper end thereof for a purpose which will subsequently appear. The front section 7 of the casing is provided with a dove-tailed opening 8 in its lower marginal edge, which engages with a complemental dove-tailed portion 9, which projects from the body of the casing. By this formation it is seen that the plate may be readily removed should it be desired to have access to the interior of the casing, by removing the rivets, at the same time, preventing the accidental displacement of the plate or its ready removal, other than by one familiar with the manner in which the plate is secured to the body of the casing.

A shackle 10 has one end 11 thereof pivotally mounted in the casing, said end 11 comprising an eye which is pivotally mounted on a stud or rivet 12, the latter in the present instance serving the dual purpose of providing an axis for the shackle, and at the same time, assisting in the securement of the plate 7 on the casing. A pair of lugs 13 and 14 extend from the outer periphery of the eye 11, the lug 13 being adapted for abutment with the inner face of the casing when the shackle is in a locked position, while the lug 14 is provided with an aperture with which is engaged one end of an elastic element 15, the latter in the present instance comprising a spring wire, so as to normally exert pressure on the lug 14, thereby causing the shackle to be automatically disengaged from the casing, just as soon as the locking member is released therefrom.

A bar 16 extends transversely in the casing 5, one of the terminals thereof being secured with the inner wall of one side of the casing, while the opposite end thereof is bifurcated, as indicated at 17, and shown to advantage in Fig. 2. The spring 15 is convoluted intermediate its ends about the transverse rod 16 and has a portion approximately midway its ends engaged with the bifurcated portion 17, so as to prevent displacement of the spring and to insure a positive and effectual operation at all times. As previously stated, one end of the spring 15 is engaged with the lug 14, while the opposite end is engaged with an ear 18 which depends from the inner face of the locking bar 19, the latter being fixedly engaged with an operating member 20 by studs 21, said studs extending through the openings 6 in the top of the casing and being slidable therein to permit disengagement of the bar 19 from the shackle 10, at times, since the free end of the shackle is provided with the usual substantially V-shaped notch or recess therein, in which one end of the locking bar 19 engages. The operating member in the present instance comprises a metallic strap which is arched intermediate its ends, as indicated at 22, so as to facilitate its actuation, since this will serve as an abutment for the thumb or finger of the person who is desirous of opening the lock.

In order to provide a further means of decoying unauthorized persons from opening the lock, it is seen that the opposite sides of the casing 5 are arched, as indicated at 23 on the opposite sides of the arched portion 22 of the releasing member 20, the arched portion 23 conforming to the contour of the arched portion 22, thereby giving the appearance of an ornamental projection.

In operation, we will assume that the shackle 10 is locked in the casing 5, as advantageously illustrated in Fig. 2. In order to release the shackle 10, pressure is exerted on the arched portion 22 of the releasing member 20, causing the member 20 to slide toward the pivoted end of the shackle in a recess which is provided therefor. By this operation, it is seen that the plate 19 which is fixedly engaged therewith is simultaneously moved by the actuation of the releasing member 20, thereby disengaging the end of the plate 19 which is engaged with the V-shaped notch in the free end of the shackle and permitting the free end of the shackle to be automatically projected from the casing in view of the spring 15 which normally exerts pressure on the lug 14 of the shackle, as previously pointed out. As soon as pressure is released from the arched portion 22 of the member 20, the bar 19 will assume its normal position beneath the opening through which the free end of the shackle is engaged, thereby causing the automatic locking of the free end of the shackle in the casing as soon as it is engaged through its opening in the top of the casing, since the free end of the shackle is beveled, so as to contact with a complemental beveled portion on the end of the bar 19 with which it contacts when advancing the free end of the shackle through the top of the casing, thereby causing the bar 19 to be moved toward the eye 11 of the shackle, although said bar is automatically reëngaged in the V-shaped recess of the shackle 10, as soon as the shackle has been advanced a sufficient distance in the casing.

It will be understood that the above description and accompanying drawings comprehend only the general and preferred embodiment of my invention and that various minor changes in details of construction, proportion and arrangement of parts may be made within the scope of the appended claims and without sacrificing any of the advantages of my invention.

Having thus fully described my invention, what I claim as new and desire to secure by Letters Patent is:

1. A keyless padlock including a casing, a shackle, one end of which is pivotally mounted in the casing and the opposite end freely movable therein, mechanism mounted in said casing to antomatically lock said free end upon its insertion in the casing, and a releasable bar mounted between the walls of the casing having a portion thereof arched to provide an abutment for facilitating actuation, the walls of said casing being extended to conform to the shape of the arched portion, whereby possibility of opening the lock by persons unfamiliarized with its operation is minimized.

2. A keyless padlock including a casing, a shackle, one end of which is pivotally mounted in the casing, and the free end adapted for insertion through an opening in the casing, mechanism carried in the casing and being in connection with the free end of the shackle to lock the latter therein upon the insertion of said free end through said opening, and adapted to automatically eject said free end from the casing upon the actuation of said mechanism, a releasing bar slidably mounted on the top of said casing between the opposite sides thereof and being in connection with said mechanism for disengaging the latter from the free end of said shackle whereby to release the shackle.

In testimony whereof I affix my signature in presence of two witnesses.

EDWARD ERICKSON.

Witnesses:
 ELMER A. ERICKSON,
 J. A. PORTER.

Copies of this patent may be obtained for five cents each, by addressing the "Commissioner of Patents, Washington, D. C."